Oct. 12, 1943.  R. L. PATTERSON  2,331,419
FURNACE
Filed Dec. 2, 1941

INVENTOR
Raymond L. Patterson
BY
ATTORNEYS

Patented Oct. 12, 1943

2,331,419

UNITED STATES PATENT OFFICE 2,331,419

FURNACE

Raymond L. Patterson, New York, N. Y., assignor to Powder Metals and Alloys, Inc., New York, N. Y., a corporation of Delaware Application December 2, 1941, Serial No. 421,348

6 Claims. (Cl. 263—10)

This invention is concerned with furnace treatment and particularly with furnaces adapted to the treatment of finely-divided solid material with gaseous treating agents. The invention is particularly adapted to the reduction of finely-divided metal oxides and the like with hydrogen gas, but may be employed in the treatment of many finely-divided solids with a variety of gaseous treating agents.

Many metal oxides react with hydrogen to form water vapor and the metal. Thus, finely-divided iron oxides react with hydrogen at elevated temperatures to form iron powder and water vapor. If the water vapor is permitted to remain in contact with the freshly formed iron, the reaction tends to reverse so that the metal powder is oxidized, at least on the surface. It is, therefore, highly desirable to remove the water vapor from contact with the freshly formed metal powder as rapidly as possible.

I have developed an improvement that is applicable to the above-described and analogous processes in which a first finely-divided material is treated with a gaseous reagent to produce a second finely-divided solid material and a gaseous reaction product that is heavier than the original gaseous reagent. In brief, my invention contemplates in a furnace structure the combination which comprises an elongated hearth, means for moving finely-divided solid material longitudinally on the hearth toward an end thereof, means for heating the solid material on the hearth, means for bringing a gaseous treating agent into contact with the solid material on the hearth, and a louver at approximately the level of the hearth for withdrawing a gaseous reaction product from the hearth, the louver being provided with a longitudinal series of passages extending outwardly from the hearth in a direction generally opposite to that taken by the solid material on the hearth, whereby the gaseous reaction product may be withdrawn from the hearth separately from the solid material. The louver may be in the hearth itself or in side walls adjacent thereto.

Preferably the hearth forms the bottom of a tubular muffle so disposed that the hearth is in a more or less horizontal position. Thus, the hearth may extend longitudinally in a horizontal plane or may be inclined slightly up or down.

In the preferred form of my furnace structure, a compartment is fastened to the muffle and communicates therewith through the louver, the compartment thus receiving gas withdrawn from the hearth. The compartment may extend longitudinally of the hearth, as described in greater detail hereinafter.

If the louver is provided in a side wall, the passages thereof preferably are approximately horizontal, although they may slope downwardly to facilitate flow of gas from the muffle or, if means are provided for sucking gas from the muffle, the passages may even be inclined upwardly.

In most instances, the longitudinal series of passages in the louver will have inner ends that are acutely oblique to the direction of passage of solid material on the hearth, although the passages may be curved with their inner ends approximately tangential to the direction of flow of material on the hearth.

A variety of means may be employed for moving the solid material longitudinally along the hearth. In its preferred form, the hearth is provided with means for imparting pulsations or vibrations lengthwise of the hearth so that the material is shaken along it. However, rabbles or a screw or chain conveyor may be employed to move the solid material along the hearth.

The gaseous treating agent (for example hydrogen) is brought into contact with the solid material (say iron oxide) on the hearth, preferably by admitting the agent into the closed muffle at a plurality of points. The iron oxide reacts with the hydrogen under the influence of heat to produce water vapor and iron powder. The water vapor is immediately withdrawn from the hearth through the slots or passages in the louver. The iron powder travels along the hearth toward the end opposite that at which the iron oxide is introduced and is there withdrawn.

These and other features of my invention will be more thoroughly understood in the light of the following detailed description taken in conjunction with the accompanying drawing, in which.

Figure 1:
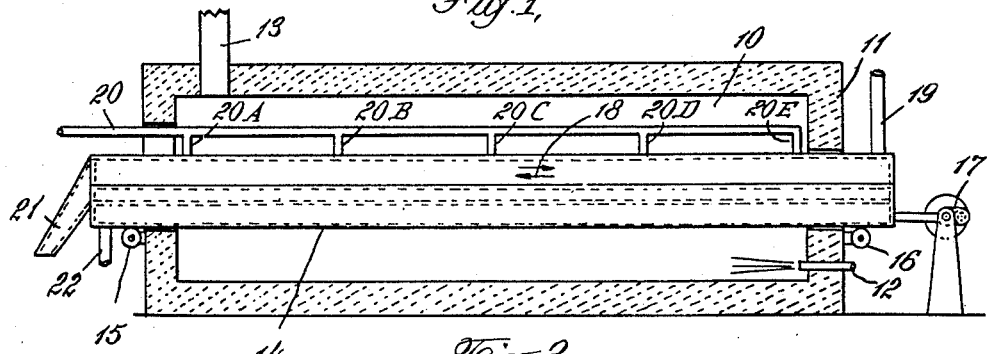
Fig. 1 is a diagrammatic longitudinal elevation, partly in section, through a furnace constructed in accordance with my invention and adapted particularly for the reduction of finely-divided iron oxide with hydrogen.

Referring now to Fig. 1, it will be observed that the apparatus comprises a heating chamber 10 of rectangular section enclosed by refractory walls 11. A heating means, for example an oil burner 12, is provided within the heating chamber, the products of combustion being exhausted at the opposite end of the heating chamber through a stack 13. A muffle 14 passes longitudinally through the heating chamber and is supported in an approximately horizontal position by means of rollers 15, 16 disposed, respectively, at the ends of the muffle immediately outside the heating chamber. Means are provided for imparting longitudinal pulsations to the muffle. Thus, a conventional cam mechanism 17 may be connected to one end of the muffle. As the cam is rotated, the muffle is reciprocated lengthwise through a stroke indicated by the arrows 18. Means such as a conduit 19 are provided for introducing finely-divided solid material, for example iron oxide, into one end of the muffle. Means also are provided for introducing a gaseous treating agent, for example hydrogen gas. Thus, hydrogen gas may be introduced into the muffle through a manifold 20, provided with a plurality of inlets 20A, 20B, 20C, 20D, 20E entering the top of the muffle. Means for discharging the solid product, for example hot iron powder, from the muffle takes the form of a chute 21 connected to the end of the muffle opposite the inlet conduit for the iron oxide. A conduit 22 is provided for removing the gaseous product, for example, water vapor, from the muffle. Thus, the conduit 22 may be connected to the lower portion of the muffle adjacent the outlet and chute 21 for iron.

Figure 2:
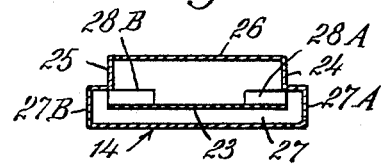
Fig. 2 is a section taken through the muffle of Fig. 1.

Referring to Fig. 2, it will be observed that the muffle comprises a hearth 23, side walls 24, 25, a top 26 and a bottom compartment 27 through which water vapor or other gaseous product is withdrawn. The bottom compartment is slightly wider than the hearth and the sides 27A, 27B extend upwardly to the top of a pair of louvers 28A, 28B, through which the muffle is connected to the bottom compartment.

Figure 3:
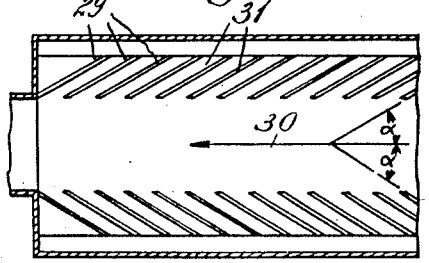
Fig. 3 is a fragmentary plan of one form of the muffle of Fig. 1 in which both side walls are provided with louvers having inclined straight walls.

Referring to Fig. 3, it will be observed that the louvers are provided with a longitudinal series of passages separated by upright plates 29. All of these plates are positioned acutely oblique to the direction of passage 30 of solid material longitudinally along the hearth. Thus, all of the plates make an acute angle α with the center line of the muffle. The passages 31 of the louver themselves make an acute angle with the direction of flow of solid material along the hearth, at least at their inner ends. Consequently, solid material moving along the hearth is not forced out of the sides, although gas is permitted to flow out of the sides of the muffle through the louvers in a direction that is generally opposite to the flow of solid material along the hearth.

Figure 4:
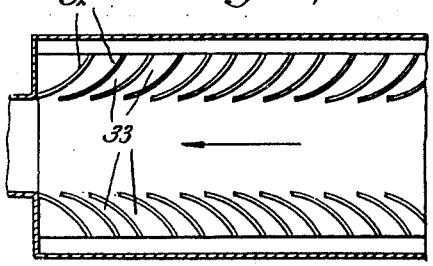
Fig. 4 is a fragmentary plan of a modified form of the muffle of Fig. 1 in which the louvers in the side walls have curved passages.

Referring now to Fig. 4, it will be observed that the muffle construction is generally the same as that of Fig. 3, except that the walls or plates 32 which form the louver and which separate the passages 33 thereof, are curved. The curvature of the plates is such that the inner ends of the plates are approximately tangential to the direction of flow of solid material along the hearth. In this way, the solid material is prevented from passing through the louver, although the gas is free to do so.

Figure 5:
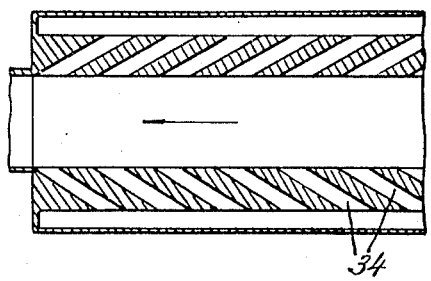
Fig. 5 is a fragmentary plan of another form of a muffle for Fig. 1 in which the louver is formed by drilling a plurality of inclined cylindrical holes through the side walls of the muffle.

In Fig. 5, the louvers are formed by drilling cylindrical holes 34 through the side walls of the muffle, these holes being acutely oblique to the direction of passage of solid material along the hearth.

Figure 6:
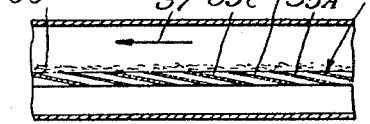
Fig. 6 is a schematic elevation of a muffle for the apparatus of Fig. 1 in which the louver is in the hearth itself.

As shown in Fig. 6, the louver may be in the hearth itself, or in fact in both side walls and hearth. Thus, the hearth 35 of Fig. 6 is formed of a series of horizontal overlapping plates 35A, 35B et seq. with passages therebetween for the withdrawal of gas from underneath a bed 36 of solid material moving along the hearth in the direction shown by the arrow 37. The overlapping plates are laid as nearly flat as is practicable and are close together with a relatively long over-lap, so that the solid material has little or no opportunity to flow through the louver.

To consider the operation of the apparatus, let it be assumed that iron oxide, for example iron oxide scale from a pickling operation, is introduced continuously into the muffle through the conduit 19. At the same time hydrogen gas is introduced into the muffle at a plurality of points through the manifold 20, and its branches 20A, 20B, 20C, 20D, 20E. The muffle is heated to a high temperature, say 850° C., by means of an oil burner 12 and the gases of combustion which flow therefrom through the heating chamber to the stack 13. Conveniently, the muffle is made of a heating resisting alloy, for example a steel containing about 27% chromium.

The iron oxide fed into one end of the muffle falls on the hearth and travels therethrough, due to the longitudinal pulsations of the muffle, toward the exit chute 21. The hydrogen gas introduced into the muffle comes in contact with the iron oxide and reduces it to iron powder. At the same time water vapor is formed. The water vapor is considerably heavier than the hydrogen and, in consequence, tends to collect in the space in the muffle immediately above the hearth. From there it flows through the louvers into the underlying compartment 27 and eventually is withdrawn through the outlet pipe 22 connected to the compartment. The iron oxide is gradually converted into iron powder as it travels along the hearth toward the exit chute, and the water vapor is removed from the contact with the iron powder substantially as fast as the water vapor is formed. In this way, the opportunity for the water vapor to reoxidize the iron is minimized.

As indicated above, a variety of means may be employed to move the material along the hearth. Thus, a screw or chain conveyor may be substituted for the vibrating mechanism 18 shown.

I claim:

1. In a furnace structure, the combination which comprises an approximately horizontal muffle, an elongated approximately horizontal hearth in the muffle, means for moving finely-divided solid material longitudinally on the hearth toward an end thereof, means for heating the solid material on the hearth, means for bringing a gaseous treating agent into contact with the solid material on the hearth, and a louver adjacent the hearth and extending longitudinally thereof at approximately the level of the hearth for withdrawing a gaseous reaction product from the hearth, the louver being provided with a longitudinal series of passages that extend outwardly from the hearth in a direction generally opposite to that taken by the solid material on the hearth, whereby the gaseous reaction product may be withdrawn from the hearth separately from the solid material.

2. In a furnace structure, the combination which comprises an elongated approximately horizontal muffle, an elongated approximately horizontal hearth in the muffle provided with side walls, means for moving finely-divided solid material longitudinally on the hearth toward an end thereof, means for heating the solid material on the hearth by conduction through the wall of the muffle, means for bringing a gaseous treating agent into contact with the solid material on the hearth, and a louver in at least one of the side walls at approximately the level of the hearth for withdrawing a gaseous reaction product laterally from the hearth, the louver being provided with a longitudinal series of passages that extend outwardly from the hearth in a direction generally opposite to that taken by the solid material on the hearth, whereby the gaseous reaction product may be withdrawn from the hearth separately from the solid material.

3. In a furnace structure, the combination which comprises an elongated approximately horizontal muffle, an elongated approximately horizontal hearth in the muffle, means for moving finely-divided solid material longitudinally on the hearth toward an end thereof, means for heating the solid material on the hearth, means for bringing a gaseous treating agent into contact with the solid material on the hearth, and a louver in the hearth for withdrawing a gaseous reaction product laterally from the hearth, the louver being provided with a longitudinal series of passages that extend from the upper surface of the hearth in a direction generally opposite to that taken by material on the hearth, whereby the gaseous reaction product may be withdrawn from the hearth separately from the solid material.

4. In a furnace structure, the combination which comprises a closed elongated approximately horizontal muffle, an elongated approximately horizontal hearth enclosed in the muffle, means for moving finely-divided solid material longitudinally on the hearth toward an end thereof, means for heating the solid material on the hearth, means for bringing a gaseous treating agent into contact with the solid material on the hearth, a louver adjacent the hearth and extending longitudinally thereto at approximately the level of the hearth for withdrawing a gaseous reaction product laterally from the hearth, the louver being provided with a longitudinal series of passages extending outwardly from the hearth in a direction generally opposite to that taken by the material on the hearth, whereby the gaseous reaction product may be withdrawn from the hearth separately from the solid material, and a compartment fastened to the muffle and communicating therewith through the louver for receiving gas withdrawn from the muffle.

5. In a furnace structure, the combination which comprises an elongated approximately horizontal muffle, an elongated approximately horizontal hearth in the muffle provided with side walls, means for moving finely-divided solid material longitudinally on the hearth toward an end thereof, means for heating the solid material on the hearth, means for bringing a gaseous treating agent into contact with the solid material on the hearth, a louver in at least one of the side walls at approximately the level of the hearth for withdrawing a gaseous reaction product laterally from the hearth, the louver being provided with a longitudinal series of passages extending outwardly from the hearth in a direction generally opposite to that taken by the solid material on the hearth, whereby the gaseous reaction product may be withdrawn from the hearth separately from the solid material, and a compartment mounted in the muffle and connected to the hearth and communicating therewith through the louver for collecting gas withdrawn from the hearth.

6. In a furnace structure, the combination which comprises a closed elongated approximately horizontal muffle, an elongated substantially horizontal hearth in the muffle, means for moving finely-divided solid material longitudinally on the hearth toward an end thereof, means for heating the solid material on the hearth, means for bringing a gaseous treating agent into contact with the solid material on the hearth, a louver adjacent the hearth and extending longitudinally thereof for withdrawing a gaseous reaction product from the hearth, the louver being provided with a longitudinal series of passages at approximately the level of the hearth and extending outwardly from the hearth in a direction generally opposite to that taken by the solid material on the hearth, whereby the gaseous reaction product may be withdrawn from the hearth separately from the solid material, and a compartment extending longitudinally of the hearth and fastened to the muffle and communicating with it through the louver for collecting the gaseous reaction product withdrawn from the hearth.

RAYMOND L. PATTERSON.